United States Patent
Luo (10) Patent No.: US 7,215,828 B2
(45) Date of Patent: May 8, 2007

(54) METHOD AND SYSTEM FOR DETERMINING IMAGE ORIENTATION

(75) Inventor: Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 862 days.

(21) Appl. No.: 10/075,004

(22) Filed: Feb. 13, 2002

(65) Prior Publication Data

US 2003/0152289 A1 Aug. 14, 2003

(51) Int. Cl.
*G06K 9/32* (2006.01)
*G06K 9/36* (2006.01)

(52) U.S. Cl. ............................. 382/289; 382/296

(58) Field of Classification Search ........ 382/289–292, 382/295, 296, 190, 305, 297
See application file for complete search history.

(56) References Cited

U.S. PATENT DOCUMENTS

| | | | |
|---|---|---|---|
| 4,870,694 A | | 9/1989 | Takeo |
| 5,642,443 A | * | 6/1997 | Goodwin et al. ........ 455/435.1 |
| 5,862,249 A | * | 1/1999 | Jang et al. .................. 382/132 |
| 5,901,245 A | | 5/1999 | Warnick et al. |
| 6,137,905 A | * | 10/2000 | Takaoka ..................... 382/173 |
| 6,148,102 A | | 11/2000 | Stolin |
| 6,151,423 A | | 11/2000 | Melen |
| 6,411,743 B1 | * | 6/2002 | Koh et al. ................... 382/290 |
| 6,512,846 B1 | * | 1/2003 | Luo ............................ 382/165 |
| 6,529,641 B1 | * | 3/2003 | Chakraborty ............... 382/296 |
| 6,798,905 B1 | * | 9/2004 | Sugiura et al. ............. 382/168 |
| 6,968,094 B1 | * | 11/2005 | Gallagher ................... 382/296 |
| 6,996,549 B2 | * | 2/2006 | Zhang et al. ................. 706/16 |

OTHER PUBLICATIONS

McLean, G.F. Kotturi, D. "Vanishing Point Detection by Line Clustering" Nov. 1995, Dept. of Mechanical Engineering, Victoria University, BC Canada; IEEE Transactions on Pattern Analysis and Machine Intelligence vol. 17, issue 11, pp. 1090-1095.*
U.S. Appl. No. 09/450,366, filed Nov. 29, 1999 by Luo.
Heisele et al., Face Detection in Still Gray Images, *Massachusetts Institute of Technology Artificial Intelligence Lab*, A.I. Memo No. 1687, May 2000, pp. 1-25.
Spitz, Script and Language Determination from Document Images, Fuji Xerox Palo Alto Lab, *Proceedings of 3rd Symposium on Document Analysis and Information Retrieval*, 1994, pp. 229-235.

(Continued)

*Primary Examiner*—Bhavesh M. Mehta
*Assistant Examiner*—Wes Tucker
(74) *Attorney, Agent, or Firm*—Thomas H. Close; Robert L. Walker (57) ABSTRACT

A method for determining the orientation of a digital image, includes the steps of: employing a semantic object detection method to detect the presence and orientation of a semantic object; employing a scene layout detection method to detect the orientation of a scene layout; and employing an arbitration method to produce an estimate of the image orientation from the orientation of the detected semantic object and the detected orientation of the scene layout.

26 Claims, 5 Drawing Sheets

OTHER PUBLICATIONS

Zhong et al., Locating Text in Complex Color Images, *Pattern Recognition*, vol. 28, 1995, No. 10, pp. 1523-1535.
Garcia et al., Text Detection and Segmentation in Complex Color Images, *Proceedings of 2000 IEEE International Conference on Acoustics, Speech and Signal Processing*, ICASSP 2000, vol. IV, pp. 2326-2329.
Vailaya et al., Automatic Image Orientation Detection, *Proceedings of International Conference on Image Processing*, 1999.

* cited by examiner

METHOD AND SYSTEM FOR DETERMINING IMAGE ORIENTATION

FIELD OF THE INVENTION

The invention relates generally to the field of digital image processing and, more particularly, to a method for determining the orientation of an image.

BACKGROUND OF THE INVENTION

There are many commercial applications in which large numbers of digital images are manipulated. For example, in the emerging practice of digital photofinishing, vast numbers of film-originated images are digitized, manipulated and enhanced, and then suitably printed on photographic or inkjet paper. With the advent of digital image processing, and more recently, image understanding, it has become possible to incorporate many new kinds of value-added image enhancements. Examples include selective enhancement (e.g., sharpening, exposure compensation, noise reduction, etc.), and various kinds of image restorations (e.g., red-eye correction).

In these types of automated image enhancement scenarios, one basic piece of semantic image understanding consists of knowledge of image orientation—that is, which of the four possible image orientations represents "up" in the original scene. Film and digital cameras can capture images while being held in the nominally expected landscape orientation, or held sideways. Furthermore, in film cameras, the film may be wound left-to-right or right-to-left. Because of these freedoms, the true orientation of the images will in general not be known a priori in many processing environments. Image orientation is important for many reasons. For example when a series of images are viewed on a monitor or television set, it is aggravating if some of the images are displayed upside-down or sideways. Additionally, it is now a common practice to produce an index print showing thumbnail versions of the images in a photofinishing order. It is quite desirable that all images in the index print be printed right side up, even when the photographer rotated the camera prior to image capture. One way to accomplish such a feat is to analyze the content of the scene semantically to determine the correct image orientation. Similar needs exist for automatic albuming, which sorts images into album pages. Clearly, it is desirable to have all the pictures in their upright orientation when placed in the album.

Probably the most useful semantic indication of image orientation is the orientation of people in a scene. In most cases, when people appear in scenes, they are oriented such that their upward direction matches the image's true upward direction. Of course, there are exceptions to this statement, as for example when the subject is lying down, such as in a picture of a baby lying on a crib bed. However, examination of large databases of images captured by amateur photographers has shown that the vast majority of people are oriented up-right in images. This tendency is even stronger in images produced by professional photographers, i.e., portraits.

Another useful semantic indication of image orientation is sky. Sky appears frequently in outdoor pictures and usually at the top of these pictures. It is possible that due to picture composition, the majority of the sky region may be concentrated on the left or right side of a picture (but rarely the bottom of the picture) Therefore, it is not always reliable to state "the side of the picture in which sky area concentrates is the up-right side of the picture".

Text and signs appear in many pictures, e.g., street scenes, shops, etc. In general, it is unlikely that signs and text are placed sideways or upside down, although mirror image or post-capture image manipulation may flip the text or signs. Detection and recognition of signs can be very useful for determining the correct image orientation, especially for documents that contain mostly text. In U.S. Pat. No. 6,151,423 issued Nov. 21, 2000, Melen disclosed a method for determining the correct orientation for a document scanned by an OCR system from the confidence factors associated with multiple character images identified in the document. Specifically, this method is applicable to a scanned page of alphanumeric characters having a plurality of alphanumeric characters. The method includes the following steps: receiving captured image data corresponding to a first orientation for a page, the first orientation corresponding to the orientation in which the page is provided to a scanner; identifying a first set of candidate character codes that correspond to characters from the page according to the first orientation; associating a confidence factor with each candidate character code from the first set of candidate character codes to produce a first set of confidence factors; producing a second set of candidate character codes that correspond to characters from the page according to a second orientation; associating a confidence factor with each candidate character code from the second set of candidate character codes to produce a second set of confidence factors; determining the number of confidence factor values in the first set of confidence factors that exceed a predetermined value; determining the number of confidence factor values in the second set of confidence factors that exceed the predetermined value; and determining that the correct page orientation is the first orientation when the number of confidence factors in the first set of confidence factors that exceeds the predetermined value is higher than the number of confidence factors in the second set of confidence factors that exceeds the predetermined value. This method was used to properly re-orient scanned documents which may not be properly oriented during scanning.

In addition to face, sky and text, other semantic objects can be identified to help decide image orientation. While semantic objects are useful for determining image orientation, they are not always present in an arbitrary image, such as a photograph. Therefore, their usefulness is limited. In addition, there can be violation of the assumption that the orientation of the semantic objects is the same as the orientation of the entire image. For example, while it is always true that the texture orientation is the same as a document composed of mostly text, it is possible that text may not be aligned with the upright direction of a photograph. Furthermore, automatic detectors of these semantic objects are not perfect and can have false positive detection (mistaking something else as the semantic object) as well as false negative detection (missing a true semantic object). Therefore, it is not reliable to rely only on semantic objects to decide the correct image orientation.

On the other hand, it is possible to recognize the correct image orientation without having to recognize any semantic object in the image. In U.S. Pat. No. 4,870,694 issued Sep. 26, 1989, Takeo teaches a method of determining the orientation of an image of a human body to determine whether the image is in the normal erect position or not. This method comprises the steps of obtaining image signals carrying the image information of the human body, obtaining the distributions of the image signal levels in the vertical direction and horizontal direction of the image, and comparing the pattern of the distribution in the vertical direction with that of the horizontal direction, whereby it is determined whether the image is in the normal position based on the comparison. This method is specifically designed for x-ray radiographs based on the characteristics of the human body in response to x-rays, as well as the fact that a fair amount of left-to-right symmetry exists in such radiographs, and a fair amount of dissimilarity exists in the vertical and horizontal directions. In addition, there is generally no background clutter in radiographs. In Comparison, clutter tends to confuse the orientation in photographs.

Vailaya et al., in "Automatic Image Orientation Detection", *Proceedings of International Conference on Image Processing*, 1999, disclosed a method for automatic image orientation estimation using a learning-by-example framework. It was demonstrated that image orientation can be determined by examining the spatial lay-out, i.e., how colors and textures are distributed spatially across an image, at a fairly high accuracy, especially for stock photos shot by professional photographers who pay higher attention to image composition than average consumers. This learning by example approach performs well when the images fall into stereotypes, such as "sunset", "desert", "mountain", "fields", etc. Thousands of stereotype or prototype images are used to train a classifier which learns to recognize the upright orientation of prototype scenes. The drawback of this method is that it tends to perform poorly on consumer snapshot photos, which tend to have arbitrary scene content that does not fit the learned prototypes.

Depending on the application, prior probabilities for image orientation can vary greatly. Of course, in the absence of other information, the priors must be uniform (25%). However, in practice, the prior probability of each of the four possible orientations is not uniform. People tend to hold the camera in a fairly constant way. As a result, in general, the landscape images would mostly be properly oriented (upside-down is unlikely), and the task would be to identify and orient the portrait images. The priors in this case may be around 70%–14%–14%–2%. Thus, the accuracy of an automatic method would need to significantly exceed 70% to be useful.

It is also noteworthy that in U.S. Pat. No. 5,642,443 issued Jun. 24, 1997, Goodwin teaches how to determine the orientation of a set of recorded images. The recorded images are scanned. The scanning operation obtains information regarding at least one scene characteristic distributed asymmetrically in the separate recorded images. Probability estimates of orientation of each of the recorded images for which at least one scene characteristic is obtained are determined as a function of asymmetry in distribution of the scene characteristic. The probability of correct orientation for the set of recorded images is determined from high-probability estimates of orientation of each of the recorded images in the set. Note that Goodwin does not rely on high-probability estimates of the orientation for all images; the orientation of the whole set can be determined as long as there are enough high-probability estimates from individual images.

Semantic object-based methods suffer when selected semantic objects are not present or not detected correctly even if they are present. On the other hand, scene layout-based methods are in general not as reliable when a digital image does not fall into the types of scene layout learned in advance.

There is a need therefore for an improved method of determining the orientation of images.

SUMMARY OF THE INVENTION

The need is met according to the present invention, by providing a system and method for determining the orientation of a digital image, that includes: employing a semantic object detection method to detect the presence and orientation of a semantic object; employing a scene layout detection method to detect the orientation of a scene layout; and employing an arbitration method to produce an estimate of the image orientation from the orientation of the detected semantic object and the detected orientation of the scene layout.

ADVANTAGES OF THE INVENTION

The present invention utilizes all types of information that are computable, whereby the image orientation can be inferred from the orientation of specific semantic objects when they are present and detected, and from the orientation of the scene layout when no semantic objects are detected, and as the most consistent interpretation when the estimated orientation of specific semantic objects and the estimated orientation of the scene layout conflict with each other.

The present invention has the advantage that an estimate of the image orientation is produced even when no semantic objects are detected, an image orientation estimate that is most consistent to all the detected information is produced when one or more semantic objects is detected.

DETAILED DESCRIPTION OF THE INVENTION

In the following description, the present invention will be described as a method implemented as a software program. Those skilled in the art will readily recognize that the equivalent of such software may also be constructed in hardware. Because image enhancement algorithms and methods are well known, the present description will be directed in particular to algorithm and method steps forming part of, or cooperating more directly with, the method in accordance with the present invention. Other parts of such algorithms and methods, and hardware and/or software for producing and otherwise processing the image signals, not specifically shown or described herein may be selected from such subject matters, components, and elements known in the art. Given the description as set forth in the following specification, all software implementation thereof is conventional and within the ordinary skill in such arts.

Figure 1:
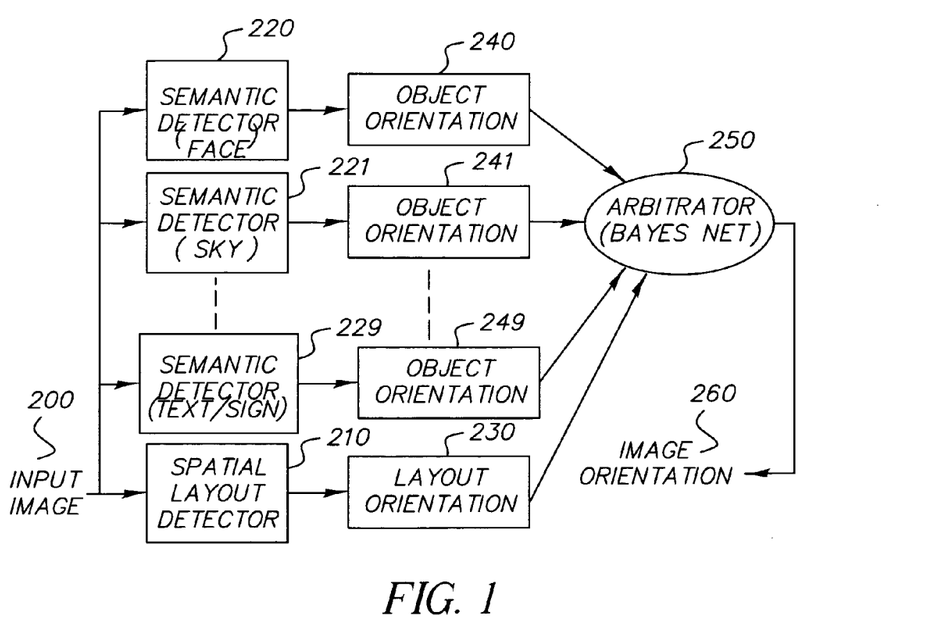
FIG. 1 is a schematic block diagram of the present invention.

FIG. 1 illustrates a preferred embodiment of the present invention. An input digital image 200 is first obtained. Next, a spatial layout detector 210 is applied to the digital image 200 to produce an estimate of the layout orientation 230, which is an estimate of the orientation of the image from how color, texture, lines and curves are distributed across the image. In the meantime, one or more semantic object detectors 220, 221, . . . 229 are also applied to the digital image 200. If at least one targeted semantic object is detected, the object orientations 240, 241, . . . 249 will be used to produce estimates of the image orientation. An example of such semantic object detector is a human face detector 220. Alternatively or simultaneously, other semantic object detectors can be used to produce alternative or additional estimates of the image orientation. For example, a sky detector 221 can be used to produce an estimate of the sky orientation 241 if sky is detected; and/or a text detector 229 can be used to produce an estimate of the text orientation 249 if text is detected. Note that each type of semantic object detector may detect none, one, or multiple instances of the targeted semantic object. The collection of multiple estimates of the image orientation may or may not agree with one another. According to the present invention, an arbitration method 250, such as a Bayes net in a preferred embodiment of the present invention, is used to derive an estimate of the image orientation 260 that is most consistent with all the individual estimates. Alternatively, a decision tree can be employed to derive the estimate of image orientation as will be described below.

Figure 2:
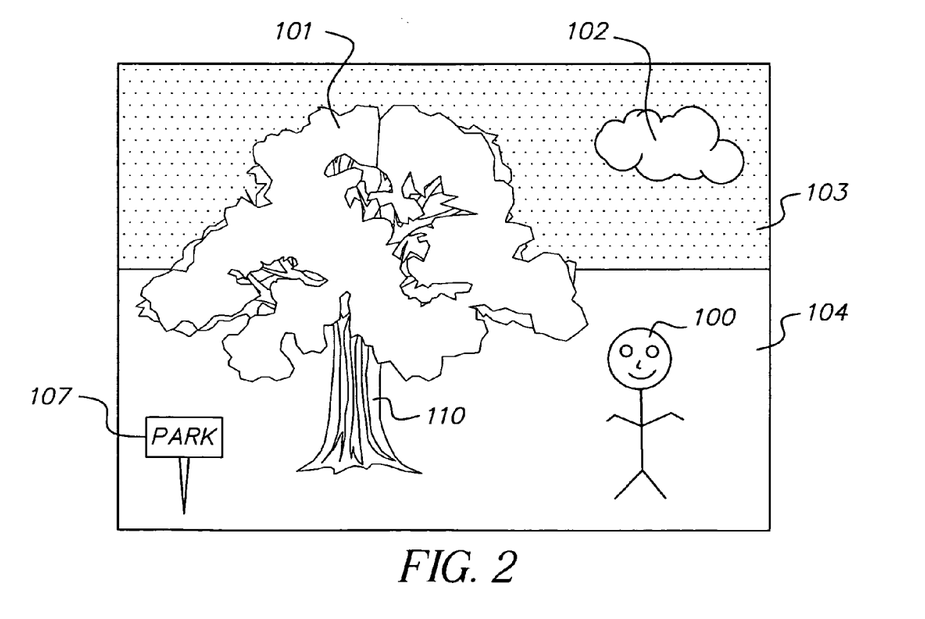
FIG. 2 is an example of a natural image.

Referring to FIG. 2, there is shown a typical consumer snapshot photograph. This photo contains a plurality of notable semantic objects, including a person with a human face region 100, a tree with a tree crown (foliage) region 101 and a tree trunk region 110, a white cloud region 102, a clear blue sky region 103, a grass region 104, a park sign 107, and other background regions. Many of these semantic objects have unique upright orientation by themselves and their orientations are often correlated with the correct orientation of the entire image (scene). For example, people, trees, text, signs are often in upright positions in an image, sky and cloud are at the top of the image, while grass regions 104, snow fields (not shown), and open water bodies such as river, lake, or ocean (not shown) tend to be at the bottom of an image.

Figure 3:
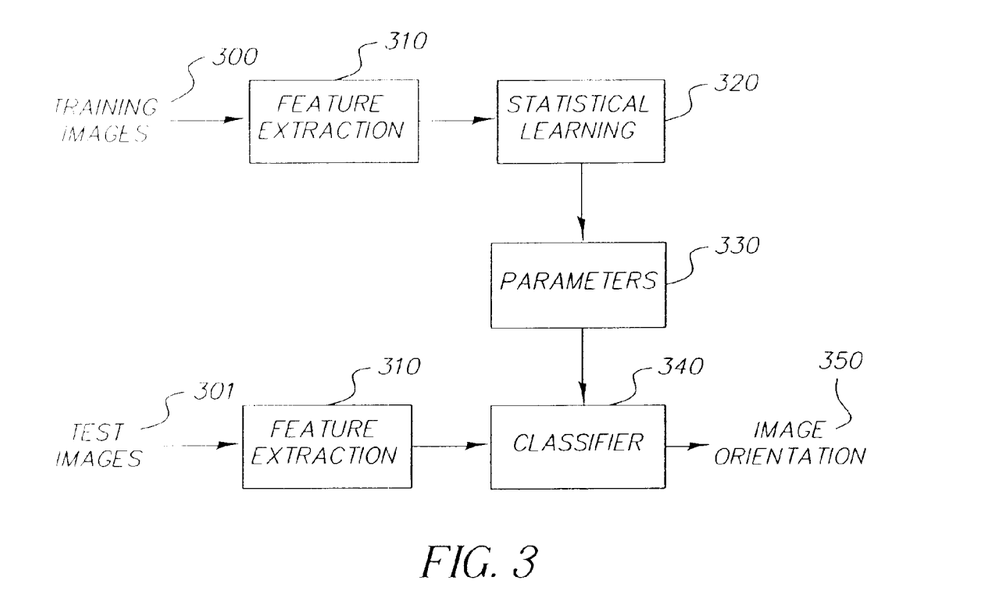
FIG. 3 is a schematic block diagram of one example of a spatial layout detector employed in the present invention.
Figure 4:
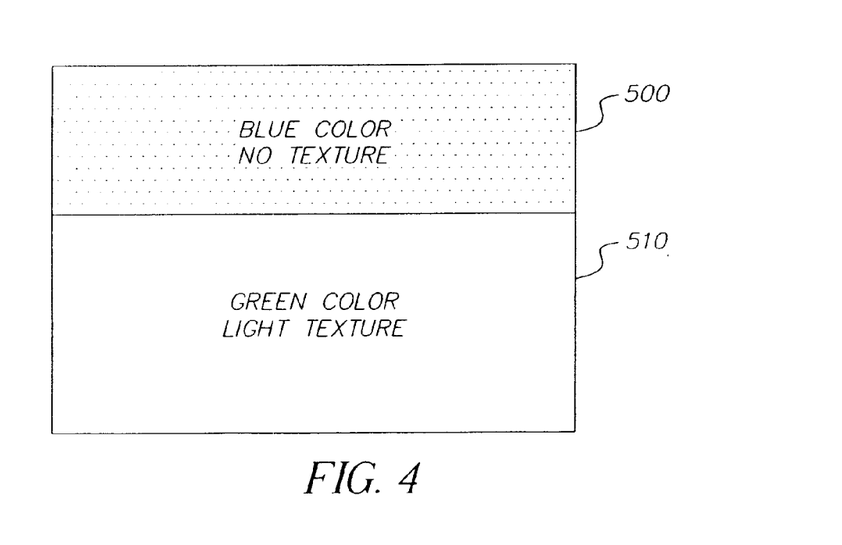
FIG. 4 is a diagram illustrating a learned spatial layout prototype.

Referring to FIG. 3, one possible embodiment of the spatial layout detector 210 will be described. A collection of training images 300, preferably those that fall into scene prototypes, such as "sunset", "beach", "fields", "cityscape", and "desert", are provided to train a classifier 340 through learning by example. Typically, a given image is partitioned into small sections. A set of characteristics, which may include color, texture, curves, lines, or any combination of these characteristics are computed for each of the sections. These characteristics, along with their corresponding positions, are used as features that feed the classifier. This process is referred to as feature extraction 310. Using a statistical learning procedure 320 (such as described in the textbook: Duda, et al., "Pattern Classification", John Wiley & Sons, 2001), parameters 330 of a suitable classifier 340, such as a support vector machine or a neural network, are obtained. In the case of a neural network, the parameters are weights linking the nodes in the network. In the case of a support vector machine, the parameters are the support vectors that define the decision boundaries between different classes (in this case, the four possible orientations of a rectangular image) in the feature space. This process is referred to as "training". The result of the training is that the classifier 340 learns to recognize scene prototypes that have been presented to it during training. One such prototype is shown in FIG. 4, which can be categorized as "blue color and no texture at the top 500, green color and light texture at the bottom 510". For a test image 301, usually not part of the training images, the same feature extraction procedure 310 described above is applied to the test image to obtain a set of features. Based on values of these features, the trained classifier 340 would find the closest prototype and produce an estimate of the image orientation 350 based on the orientation of the closest matched prototype. For example, the prototype shown in FIG. 4 would be found to best match the image shown in FIG. 2. Therefore, it can be inferred that the image is already in the upright orientation.

Alternatively, image orientation can be determined from a plurality of semantic objects, including human faces, sky, text, sign, grass, snow field, open water, or any other semantic objects that appear frequently in images, have strong orientations by themselves, have orientations strongly correlated with image orientation, and last but not least, can be detected with reasonably high accuracy automatically.

Human face detection is described in many articles; for example, Heisele et al., "Face Detection in Still Gray Images," *MIT Artificial Intelligence Lab,* Memo 1687, May 2000. In order to determine the image orientation, a face detector can be applied to all four rotated versions of the input digital image. The orientation that corresponds to most (in number of detected faces) or most consistent (in consistency among the orientations of detected faces) detection of faces is chosen as the most likely image orientation.

Text detection and recognition has also been described in many articles and inventions. Garcia et al. in "Text Detection and Segmentation in Complex Color Images", *Proceedings of 2000 IEEE International Conference on Acoustics, Speech and Signal Processing (ICASSP 2000),* Vol. IV, pp. 2326–2329, and Zhong et al. in "Locating Text In Complex Color Images"; *Pattern Recognition,* Vol. 28, No. 10, 1995, pp. 1523–1535, describe methods for text detection and segmentation in complex color images. Note that it is in general more difficult to perform this task in a photograph with a plurality of objects (other than the text) than a scanned copy of a document, which consists of mostly text with fairly regular page layout. In general, once text is extracted from an image, texture recognition can be performed. In order to determine the image orientation, an optical character recognizer (OCR) can be applied to all four rotated versions of the text area. The orientation that corresponds to most (in number of detected characters) or most consistent (in consistency among the orientations of detected characters) detection of text is chosen as the most likely image orientation. A complete system for recognizing text in a multicolor image is described in U.S. Pat. No. 6,148,102 issued Nov. 14, 2000 to Stolin. It is also possible to detect the orientation of the text without explicitly recognizing all the characters by detecting so-called "upward concavity" of characters (see A. L. Spitz, "Script and Language Determination from Document Images", *Proceedings of 3$^{rd}$ Symposium on Document Analysis and Information Retrieval,* 1994, pp. 229–235).

Figure 5:
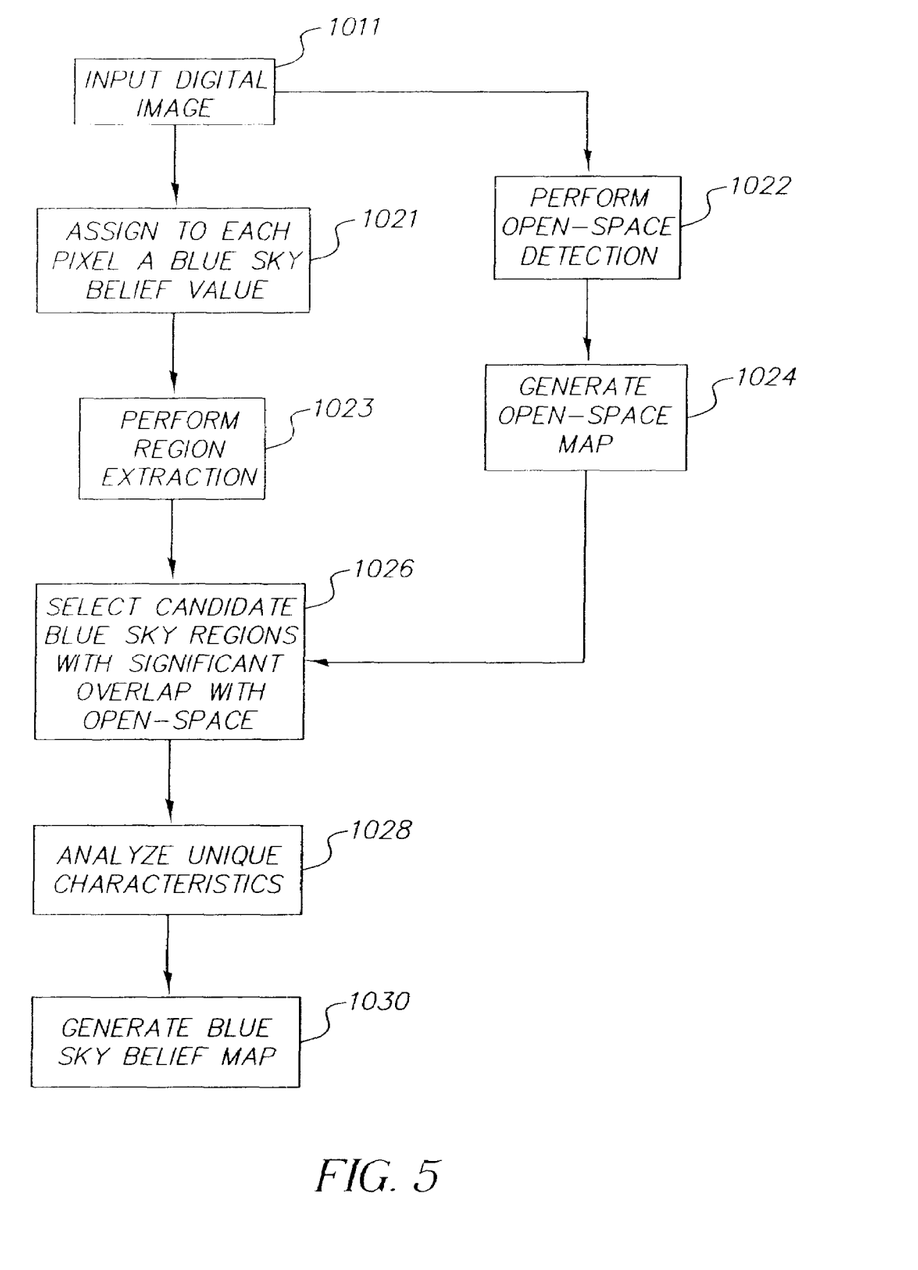
FIG. 5 is a block diagram showing one method for detecting blue-sky regions.

FIG. 5 shows a preferred embodiment of the present invention for clear blue-sky detection. First, an input color digital image 1011 is processed by a color and texture pixel classification step based on color and texture features by a suitably trained multi-layer neural network. The result of the pixel classification step is that each pixel is assigned a belief value 1021 as belonging to blue sky. Next, a region extraction step 1023 is used to generate a number of candidate blue-sky regions. At the same time, the input image is processed by an open-space detection step 1022 to generate an open-space map 1024 (described in U.S. Pat. No. 5,901,245 issued May 4, 1999 to Warnick et al., incorporated herein by reference). Only candidate regions with significant (e.g., greater than 80%) overlap with any region in the open-space map are "smooth" and will be selected as candidates 1026 for further processing. These retained candidate regions are analyzed 1028 for unique characteristics. Due to the physics of atmosphere, blue sky exhibits a characteristic desaturation effect, i.e., the degree of blueness decreases gradually towards the horizon. This unique characteristic of blue sky is used to validate the true blue-sky regions from other blue-colored subject matters. In particular, a $2^{nd}$ order polynomial can be used to fit a given smooth, sky-colored candidate region in red, green, and blue channels, respectively. The coefficients of the polynomial can be classified by a trained neural network to decide whether a candidate region fits the unique characteristic of blue sky. Only those candidate regions that exhibit these unique characteristics are labeled in a belief map as smooth blue-sky regions 1030. The belief map contains confidence values for each detected blue sky region.

Unlike in the cases of faces and text, image orientation can be directly derived from the detected blue-sky region, without having to examine four rotated versions of the original input digital image. The desaturation effect naturally reveals that the more saturated side of the sky region is up. However, it is possible a plurality of detected sky regions do not suggest the same image orientation either because there are falsely detected sky regions or because there is significant lens falloff (so that it is ambiguous for a sky region in the corner of an image as to which way is up).

Figure 6:
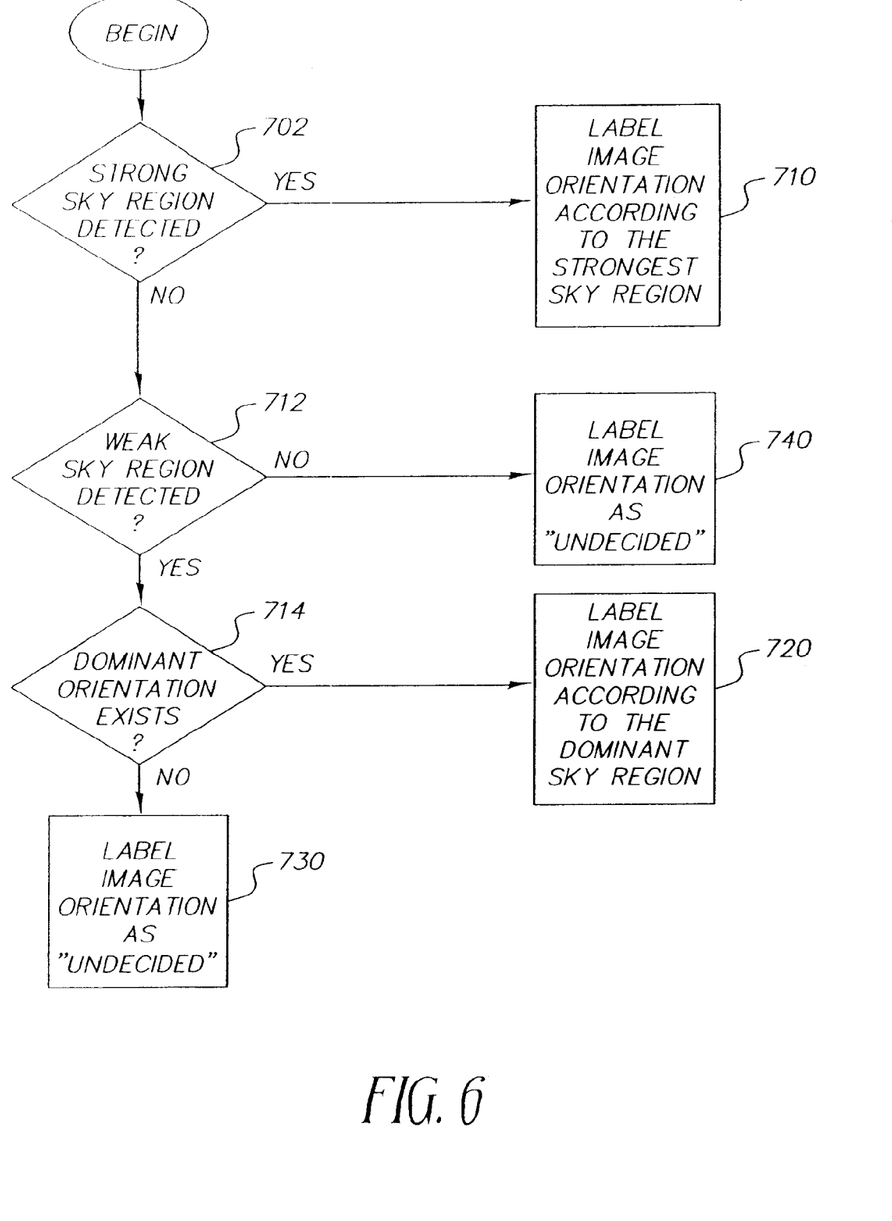
FIG. 6 is a block diagram showing one method for determining the image orientation from a plurality of detected blue-sky regions.

A rule-based decision tree as shown in FIG. 6 can be employed for resolving the conflict. The rule-based tree works as follows. If one or more "strong" sky regions are detected 702 with strong confidence values (confidence values greater than a predetermined minimum), the image orientation is labeled with respect to the strongest sky region 710. In a preferred embodiment of the present invention, the strongest sky region is selected as the sky region that has the largest value obtained by multiplying its confidence value and its area (as a percentage of the entire image). If only "weak" sky regions are detected 712 with weak confidence values, and a dominant orientation exists 714, the image orientation is labeled with respect to the majority of detected sky regions 720. If there is no dominant orientation among the detected weak sky regions, the image orientation is labeled "undecided" 730. Of course, if no sky region, weak or strong, is detected, the image orientation is also labeled "undecided" 740.

Other general subject matter detection (cloudy sky, grass, snow field, open water) can be performed using the same framework with proper parameterization.

Figure 7:
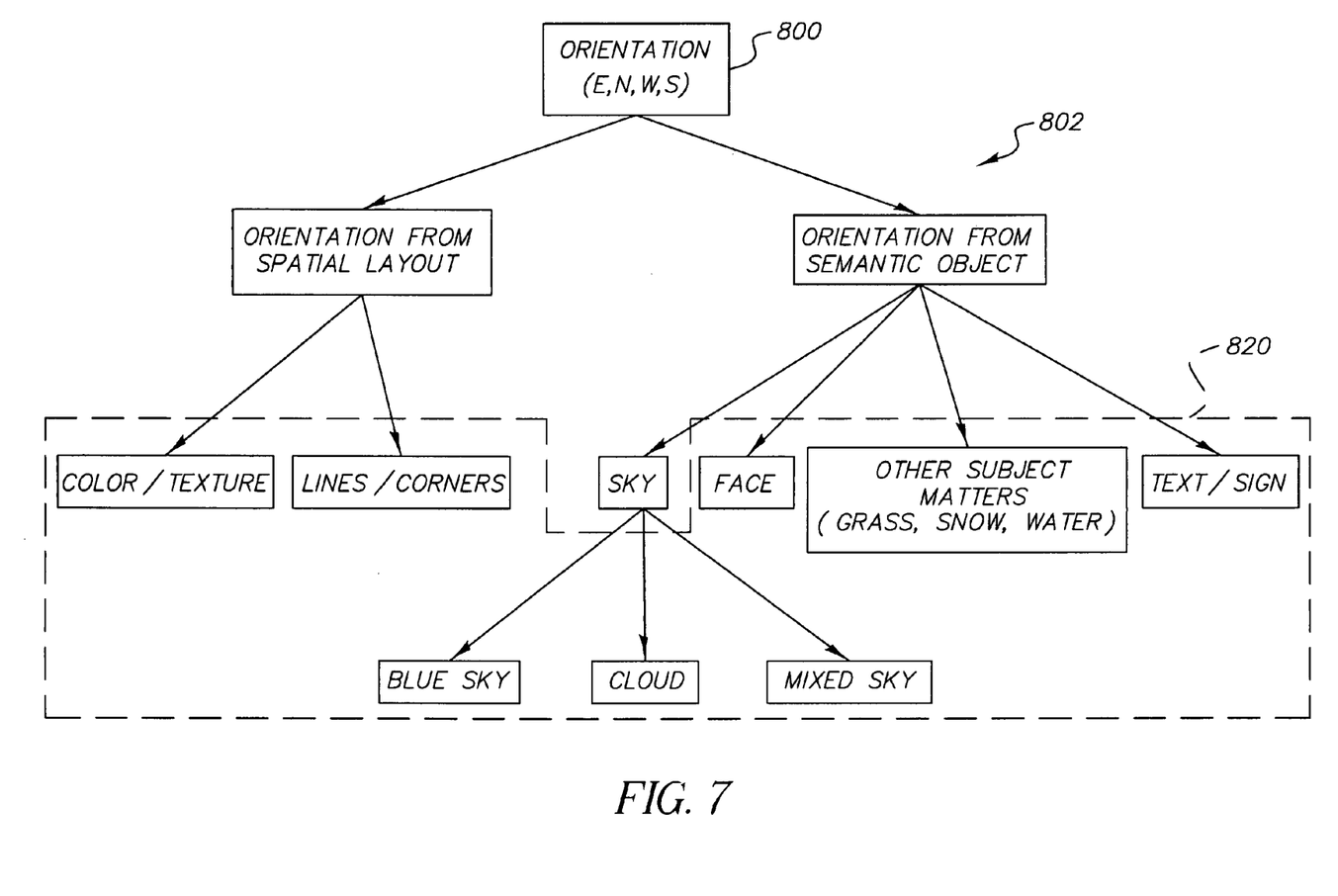
FIG. 7 is a schematic block diagram illustrating a Bayesian network used according to one method of the present invention for determining the image orientation from all estimates of the image orientation.

Referring to FIG. 7, there is shown an example of the Bayesian network used as the arbitrator 250 described first in FIG. 1. All the orientation estimates, either from semantic object detectors or from spatial layout detectors, collectively referred to as evidences, are integrated by a Bayes net to yield an estimate of the overall image orientation (and its confidence level). On one hand, different evidences may compete with or contradict each other. On the other hand, different evidences may mutually reinforce each other according to prior models or knowledge of typical photographic scenes. Both competition and reinforcement are resolved by the Bayes net-based inference engine.

A Bayes net (see textbook: J. Pearl, "Probabilistic Reasoning in Intelligent Systems," San Francisco, Calif., Morgan Kaufmann, 1988) is a directed acyclic graph that represents causality relationships between various nodes in the graph. The direction of links between nodes represents causality. A directed link points from a parent node to a child node. A Bayes net is a means for evaluating a joint Probability Distribution Function (PDF) of various nodes. Its advantages include explicit uncertainty characterization, fast and efficient computation, quick training, high adaptivity and ease of building, and representing contextual knowledge in human reasoning framework. A Bayes net consists of four components:

1. Priors: The initial beliefs about various nodes in the Bayes net;
2. Conditional Probability Matrices (CPMs): the statistical relationship between two connected nodes in the Bayes net;
3. Evidences: Observations from feature detectors that are input to the leaf nodes of the Bayes net; and
4. Posteriors: The final computed beliefs after the evidences have been propagated through the Bayes net.

Referring again to FIG. 7, a multi-level Bayes net 802 assumes various conditional independence relationships between various nodes. The image orientation will be determined at the root node 800 and the evidences supplied from the detectors are input at the leaf nodes 820. The evidences (i.e. initial values at the leaf nodes) are supplied from the semantic detectors and the spatial layout detector. A leaf node is not instantiated if the corresponding detector does not produce an orientation estimate. After the evidences are propagated through the network, the root node gives the posterior belief in a particular orientation (out of four possible orientations) being the likely image orientation. In general the orientation that has the highest posterior belief is selected as the orientation of the image. It is to be understood that the present invention can be used with a Bayes net that has a different topologic structure without departing from the scope of the present invention.

Bayes nets need to be trained before hand. One advantage of Bayes nets is that each link is assumed to be independent of other links at the same level provided that the network has been correctly constructed. Therefore, it is convenient for training the entire net by training each link separately, i.e., deriving the CPM for a given link independent of others. In general, two methods are used for obtaining CPM for each root-feature node pair:

1. Using Expert Knowledge. This is an ad-hoc method. An expert is consulted to obtain the conditional probability of observing a child node given the parent node.
2. Using Contingency Tables. This is a sampling and correlation method. Multiple observations of a child node are recorded along with information about its parent node. These observations are then compiled to create contingency tables which, when normalized, can then be used as the CPM. This method is similar to neural network type of training (learning). This method is preferred in the present invention.

One advantage of using a Bayesian network is that the prior probabilities of the four possible orientations can be readily incorporated at the root node of the network.

Alternatively, a decision tree can be used as the arbitrator. A simple decision tree can be designed as follows. If human faces are detected, label the image orientation according to the orientation of the detected faces; if no faces are detected and blue-sky regions are detected, label the image orientation according to the orientation of the detected sky regions;

if no semantic objects are detected, label the image orientation according to the orientation estimated from the spatial layout of the image. In general, although useful, a decision tree is not expected to perform quite as well as the Bayes net described above.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The present invention may be implemented for example in a computer program product. A computer program product may include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The present invention can be used in a number of applications, including but not limited to: a wholesale or retail digital photofinishing system (where a roll of film is scanned to produce digital images, digital images are processed by digital image processing, and prints are made from the processed digital images), a home printing system (where a roll of film is scanned to produce digital images or digital images are obtained from a digital camera, digital images are processed by digital image processing, and prints are made from the processed digital images), a desktop image processing software, a web-based digital image fulfillment system (where digital images are obtained from media or over the web, digital images are processed by digital image processing, processed digital images are output in digital form on media, or digital form over the web, or printed on hard-copy prints by an order over the web), kiosks (where digital images are obtained from media or scanning prints, digital images are processed by digital image processing, processed digital images are output in digital form on media, or printed on hard-copy prints), and mobile devices (e.g., a PDA or cellular phone, where digital images can be processed by a software running on the mobile device, or by a server through wired or wireless communications between the server and the client). In each case, the present invention can be a component of a larger system. In each case, the scanning or input, the digital image processing, the display to a user (if needed), the input of user requests or processing instructions (if needed), the output can each be on the same or different devices and physical locations; communication between them can be via public or private network connections, or media based communication.

The present invention has been described with reference to a preferred embodiment. Changes may be made to the preferred embodiment without deviating from the scope of the present invention.

PARTS LIST 100 human face region
101 tree crown (foliage) region
102 cloud region
103 clear blue sky region
104 grass region
107 sign (text)
110 tree trunk region
200 input digital image
210 spatial layout detector
220 semantic object detector (human face)
221 semantic object detector (sky)
229 semantic object detector (text)
230 layout orientation estimate
240 face object orientation
241 sky object orientation
249 text object orientation
250 arbitrator method
260 image orientation
300 training images
301 an input testing image
310 feature extraction step
320 learning procedure
330 parameters (of the classifier)
340 classifier
350 image orientation estimate (according to spatial layout)
500 top portion of an image
510 bottom portion of an image
702 detect strong sky region step
712 detect weak sky region step
710 label image orientation step
714 detect dominant orientation step
720 label image orientation step
730 label image orientation undecided step
740 label image orientation undecided step
800 root node
802 Bayes net
820 leaf nodes
1011 input color digital image
1021 color and texture pixel classification step
1022 open-space detection step
1023 region extraction step
1024 open-space map
1026 retain overlapping candidate regions step
1028 analyze unique characteristics step
1030 blue sky regions

What is claimed is:

1. A method for determining the orientation of a captured digital image, comprising the steps of:
   a) employing a semantic object detection method to detect the presence and orientation of a semantic object in the digital image;
   b) employing a scene layout detection method to detect the orientation of a scene layout of the digital image; and
   c) employing an arbitration method to produce an estimate of the image orientation by arbitrating between the orientation of the detected semantic object and the detected orientation of the scene layout.

2. The method claimed in claim 1, wherein the step of employing a semantic object detection method comprises employing a plurality of semantic object detectors to detect a plurality of semantic objects and their orientations.

3. The method claimed in claim 2, wherein the semantic objects are selected from the group of semantic objects comprising: a human face, a human figure, clear blue sky, lawn grass, a snow field, body of open water, tree, a sign, and written text.

4. The method claimed in claim 1, wherein the scene layout detection method comprises the steps of:
   a) dividing the digital image into non-overlapping image blocks;
   b) computing at least one statistic for each image block;

c) forming a feature vector by concatenating the statistics computed from the image blocks; and
d) using a classifier trained with a plurality of scene prototype images to produce an estimate of the image orientation.

5. The method claimed in claim 4, wherein the statistic is related to one or more of: color, texture, and straight lines in the digital image.

6. The method claimed in claim 1, wherein the scene layout detection method comprises the steps of:
a) extracting straight lines from the digital image;
b) computing a point of convergence (or vanishing point) from a subset of the extracted straight lines; and
c) producing an estimate of the image orientation according to the vanishing point.

7. The method claimed in claim 1, wherein the arbitration method employs a Bayes Net.

8. The method claimed in claim 1, wherein the arbitration method employs a decision tree.

9. The method claimed in claim 1, further comprising the step of: rotating the digital image to re-orient the digital image in an upright direction.

10. A computer program product comprising computer readable storage medium having a computer program stored thereon for performing the method of claim 1.

11. A system for processing a digital color image, comprising:
a semantic object detector to determine the presence and orientation of a semantic object in the digital color image;
a scene layout detector to determine the orientation of a scene layout of the digital color image, said scene layout detector having a classifier trained with a plurality of scene prototype images;
an arbitrator responsive to the orientation of the semantic object and the orientation of the scene layout to produce an estimate of the image orientation; and
an image rotator to re-orient the digital image in the upright direction.

12. The system claimed in claim 11, wherein the step of employing a semantic object detection method comprises employing a plurality of semantic object detectors to detect a plurality of semantic objects and their orientations.

13. The system claimed in claim 12, wherein the semantic objects are selected from the group of semantic objects comprising: a human face, a human figure, clear blue sky, lawn grass, a snow field, body of open water, tree, a sign, and written text.

14. The system claimed in claim 11, wherein the scene layout detector comprises:
a) means for dividing the digital image into non-overlapping image block;
b) means for computing at least one statistic for each image block;
c) means for forming a feature vector by concatenating the statistics computed from the image blocks; and
d) said classifier.

15. The system claimed in claim 14, wherein the statistic is related to one or more of: color, texture, and straight lines in the digital image.

16. The system claimed in claim 11, wherein the scene layout detector, comprises:
a) means for extracting straight lines from the digital image;
b) means for computing a point of convergence (or vanishing point) from a subset of the extracted straight lines; and
c) means for producing an estimate of the image orientation according to the vanishing point.

17. The system claimed in claim 11, wherein the arbitrator is a Bayes Net.

18. The system claimed in claim 11, wherein the arbitrator includes a decision tree.

19. The method of claim 1 wherein said captured digital image is of a natural scene.

20. The method of claim 19 wherein the orientation of the detected semantic object and the detected orientation of the scene layout are contradictory.

21. The system of claim 2, wherein:
each of said semantic object detectors detects the respective said semantic object orientation to be any one of: upright orientation, upside-down orientation, left-to-right orientation, right-to-left orientation, and undecided orientation and
said scene layout detection method determines the orientation of the scene layout to be any one of: upright orientation, upside-down orientation, left-to-right orientation, and right-to-left orientation.

22. A system for processing a digital image comprising:
one or more semantic object detectors, each said semantic object detector being adapted to determine the presence and orientation in the digital image of a semantic object of a respective one of a plurality of different types;
a scene layout detector adapted to determine the orientation of a scene layout of the digital image; and
an arbitrator adapted to arbitrate between said determined semantic object and scene layout orientations and produce an estimate of an orientation of the digital image.

23. The system of claim 22, wherein each of said semantic object detectors determines the respective said semantic object orientation to be any one of: upright orientation, upside-down orientation, left-to-right orientation, right-to-left orientation, and undecided orientation.

24. The method of claim 23 wherein said orientations determined by two or more of said detectors are contradictory.

25. The method of claim 22 wherein said scene layout detector has a classifier trained with a plurality of scene prototype images.

26. The method of claim 25, wherein said classifier is one of a support vector machine and a neural network.

* * * * *